United States Patent [19]

Ito

[11] Patent Number: 5,410,588
[45] Date of Patent: Apr. 25, 1995

[54] MOBILE RADIO COMMUNICATIONS SYSTEM HAVING A SUPERVISING RADIO TRANSMITTING STATION FOR TRANSMITTING A REFERENCE SYNCHRONIZING SIGNAL TO A FIRST AND SECOND BASE STATIONS VIA A RADIO LINK

[75] Inventor: Koichi Ito, Tokyo, Japan

[73] Assignee: Kabushiki Kaisha Toshiba, Kawasaki, Japan

[21] Appl. No.: 274,359

[22] Filed: Jul. 13, 1994

Related U.S. Application Data

[63] Continuation of Ser. No. 861,568, Apr. 10, 1992, abandoned.

[30] Foreign Application Priority Data

Apr. 3, 1991 [JP] Japan ................... 3-071191

[51] Int. Cl.$^6$ ................ H04M 11/00; H04J 3/24; H04J 3/16; H04B 7/14
[52] U.S. Cl. ................ 379/58; 370/94.1; 370/95.1; 379/57; 379/60; 455/20; 455/33.2
[58] Field of Search ............ 329/360; 370/94.1, 95.1; 371/42; 375/97; 379/56, 57, 58, 59, 60, 63; 455/20, 33.2, 260

[56] References Cited

U.S. PATENT DOCUMENTS

| | | | |
|---|---|---|---|
| 5,046,124 | 9/1991 | Wu et al. .................. | 455/20 |
| 5,084,891 | 1/1992 | Ariyavisitakul et al. ........ | 371/42 |
| 5,153,903 | 10/1992 | Eastmond et al. ............ | 379/57 |
| 5,159,596 | 10/1992 | Itoh ........................ | 370/95.1 |
| 5,175,758 | 12/1992 | Levanto et al. .............. | 379/57 |
| 5,184,347 | 2/1993 | Farwell et al. .............. | 370/94.1 |
| 5,195,127 | 3/1993 | Ichikawa et al. ............. | 379/58 |
| 5,257,401 | 10/1993 | Dahlin et al. ............... | 455/33.2 |
| 5,260,943 | 11/1993 | Comroe et al. ............... | 370/95.1 |

FOREIGN PATENT DOCUMENTS

| | | |
|---|---|---|
| 3-40612 | 2/1991 | Japan . |
| 9100660 | 1/1990 | WIPO ........................ 379/60 |

Primary Examiner—Curtis Kuntz
Assistant Examiner—William Cumming
Attorney, Agent, or Firm—Finnegan, Henderson Farabow, Garrett & Dunner

[57] ABSTRACT

A radio communication system having a plurality of base stations, each forming a radio zone, and a plurality of mobile stations connected to those base stations in a time-division multiplexing manner via digital radio circuitry that time-division multiplexes a plurality of time slots for those base stations, comprising at least one supervising radio transmitting station for transmitting a reference synchronizing signal to a first and a second base station of the plurality of base stations via radio circuitry, the reference synchronizing signal being used in establishing synchronous relationship between the first and second base stations, receiving section installed in each of the first and second base stations, for receiving the reference synchronizing signal from the supervising radio transmitting station via radio circuitry, and synchronizing section installed in each of the first and second base stations, for establishing synchronous time-slot relationship in the digital circuitry between those base synchronizing stations and the mobile stations, based on the reference signal received by the receiving section.

20 Claims, 9 Drawing Sheets

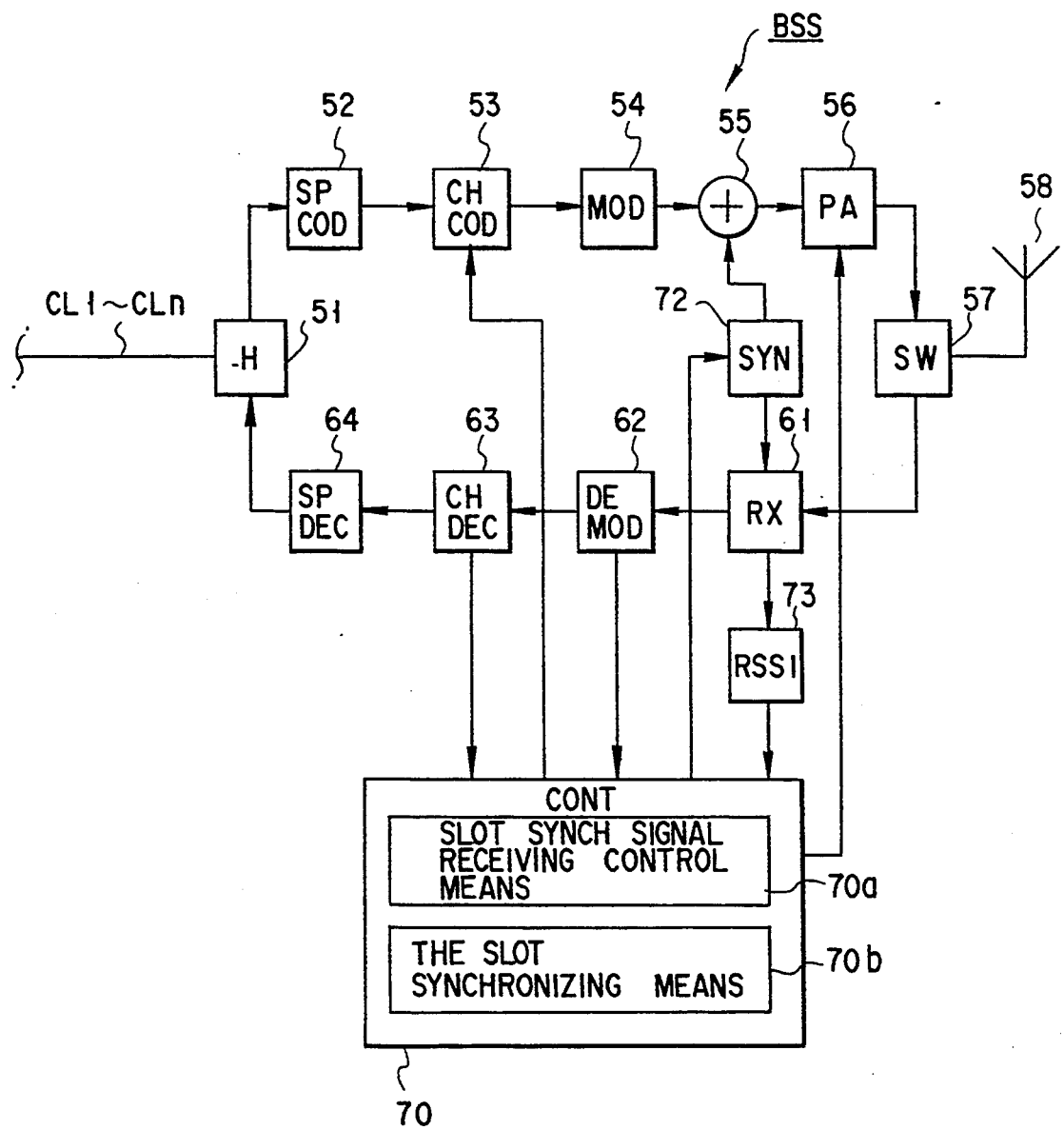
F I G. 3

MOBILE RADIO COMMUNICATIONS SYSTEM HAVING A SUPERVISING RADIO TRANSMITTING STATION FOR TRANSMITTING A REFERENCE SYNCHRONIZING SIGNAL TO A FIRST AND SECOND BASE STATIONS VIA A RADIO LINK

This application is a continuation of application Ser. No. 07/861,568, filed Apr. 10, 1992, now abandoned.

BACKGROUND OF THE INVENTION

1. Field of the Invention

This invention relates to a mobile radio communication system such as a portable radio telephone system or a land mobile radio telephone system, and more particularly to a communication system based on a cellular system.

2. Description of the Related Art

FIG. 10 shows a schematic diagram of a conventional portable or land mobile radio telephone system using the cellular system. Such a system is composed of a control station CS connected to a wire telephone network NW, a plurality of base stations connected to the control station CS via wire links (land lines) CL1 to CLn, and a plurality of mobile stations PS1 to PSm. The base stations BS1 to BSn have radio zones E1 to En, called cells, in different areas, respectively. The mobile (radio) stations PS1 to PSm are connected via radio links to the base stations in the radio zones where they are at present. Each base station is then connected to the wire telephone network NW via the control station CS. With this configuration, the mobile station is able to communicate with a telephone set connected to the wire telephone network. When any one of mobile stations PS1 to PSm is moving from one radio zone to another while communicating, the control station CS switches from the current radio link to that of the new radio zone, thereby maintaining the continuity of the communication now in operation.

FIG. 11 is a diagram illustrating the originating sequence of a mobile station in the above system. For example, it is assumed that the hook switch of mobile station PS3 is turned on to originate a call (for a calling request). The mobile station PS3 first selects a radio frequency for control, and generates an originating signal including its identification code (ID code). It then transmits the originating signal to the radio base station BS2 via a control channel of the radio frequency. Receiving the originating signal from mobile station PS3, the base station BS2, which has been monitoring the occurrence of a calling request on the control channel in the waiting state, produces a calling signal including the ID code of mobile station PS3 and its own ID code and transfers it to the control station CS.

The control station CS judges whether or not this calling request is from its own system based on the ID codes contained in the calling signal. If they are ID codes of the system, the station CS sends back to the base station BS2 a calling answer signal ACK including speech channel designation (specifying) information to specify a radio frequency for talking. After the base station BS2 has received the calling answer signal from the control station CS, it generates an originating answer signal including speech channel designation (specifying) information and the ID code of the calling mobile station PS3, and transmits it to the mobile station PS3 via the control channel.

After mobile station PS3 has received the originating answer signal, it attempts to establish a speech channel of the above frequency to the base station BS2, according to the speech channel designation (specifying) information in the answer signal. Once the speech channel has been established, a calling signal is sent from the control station CS to the wire telephone network NW. Receiving this calling signal, the network NW sends a signal requesting the transmission of a dial signal to the calling mobile station PS3 via the control station CS and base station BS2. The mobile station PS3, receiving the dial signal transmission request, indicates that dialing is possible.

The caller acknowledges this indication and dials the called party's number on the dial plate. The mobile station PS3 then transmits to the base station BS2 a dial signal corresponding to the dial number via the radio speech channel. Receiving the dial signal, the base station BS2 transfers this signal to the network NW via the control station CS. The network NW then performs a switching operation to call a desired telephone. Once the called party has answered the call, getting his telephone off the hook, a channel is established between the called party's telephone and the calling mobile station PS3. From this time on, communication is possible through the channel between them.

For portable and land mobile radio telephone systems based on the cellular system, the need for more mobile stations to be served is increasing. To meet this demand, a method has been proposed which transmits the digitized signal by a TDMA (Time Division Multiple Access) system, where not only control signals but also speech signals have been digitized. In the TDMA system, the transmitted signal is constructed in frames for each radio frequency. One frame is then time-divided into, for example, 6 time slots as shown in FIG. 12, each slot being allocated as a communication channel to a separate mobile station. This system can cover nearly six times as many mobile stations as a conventional equivalent.

In today's cellular radio telephone systems, a radio frequency is allocated permanently to each of base stations BS1 to BSn, with the same radio frequency allocated again to another base station separated enough not to introduce interference. This raises the following problem in spite of using the TDMA system.

In a communication system using the TDMA system, one radio frequency offers, for example, 6 communication channels as described earlier. Even when only one channel is used by a base station, however, the corresponding radio frequency is occupied by this low-traffic base station. As a result, for example, even if a base station with higher traffic, adjacent to the low traffic base station, wants to use the idle channels of the radio frequency being used, it is virtually impossible for the higher traffic station to use the idle ones.

A system may be considered which allows the control station to supply a reference synchronizing signal to each base station via a control line to synchronize time slots between base stations. This system, however, requires the laying of a control line from the control station to each base station. Depending on the length of each control line, the delay of the reference synchronizing signal must be compensated for. This not only makes the facilities larger, but also requires more complicated synchronizing control to harmonize the timing of the reference synchronizing signal to each base station. The greater the number of base stations, the more complicated the synchronizing control. The complexity of synchronizing control sometimes makes it impossible to realize such a communication system.

SUMMARY OF THE INVENTION

An object of the present invention is to provide a mobile radio communication system with simple equipment easy to control, capable of coping well with imbalanced traffic in the system as a whole by allowing different time slots of the same radio frequency to be shared by the base stations.

Another object of the present invention is to provide a mobile radio communication system that is constructed so as to always maintain a stable radio frequency without the installation of an expensive oscillating circuit in each base and mobile stations, with a view to increasing the quality of communication and lowering the costs of base and mobile stations.

A radio communication system having a plurality of base stations, each forming a radio zone, and a plurality of mobile stations connected to those base stations in a time-division multiplexing manner via digital radio circuitry that time-division multiplexes a plurality of time slots for those base stations, comprising at least one supervising radio transmitting station for transmitting a reference synchronizing signal to a first and a second base station of the plurality of base stations via radio circuitry, the reference synchronizing signal being used in establishing synchronous relationship between the first and second base stations, receiving section installed in each of the first and second base stations, for receiving the reference synchronizing signal from the supervising radio transmitting station via radio circuitry, and synchronizing section installed in each of the first and second base stations, for establishing synchronous timeslot relationship in the digital circuitry between those base synchronizing stations and the mobile stations, based on the reference signal received by the receiving section.

The present invention features a construction wherein the supervising radio transmitting station is installed in a pager base station that transmits a paging signal to a paging apparatus, or is designed to have the function of a pager base station as well.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a circuit diagram of a base station in the system of FIG. 1;

DETAILED DESCRIPTION OF THE PREFERRED EMBODIMENTS

Figure 1:
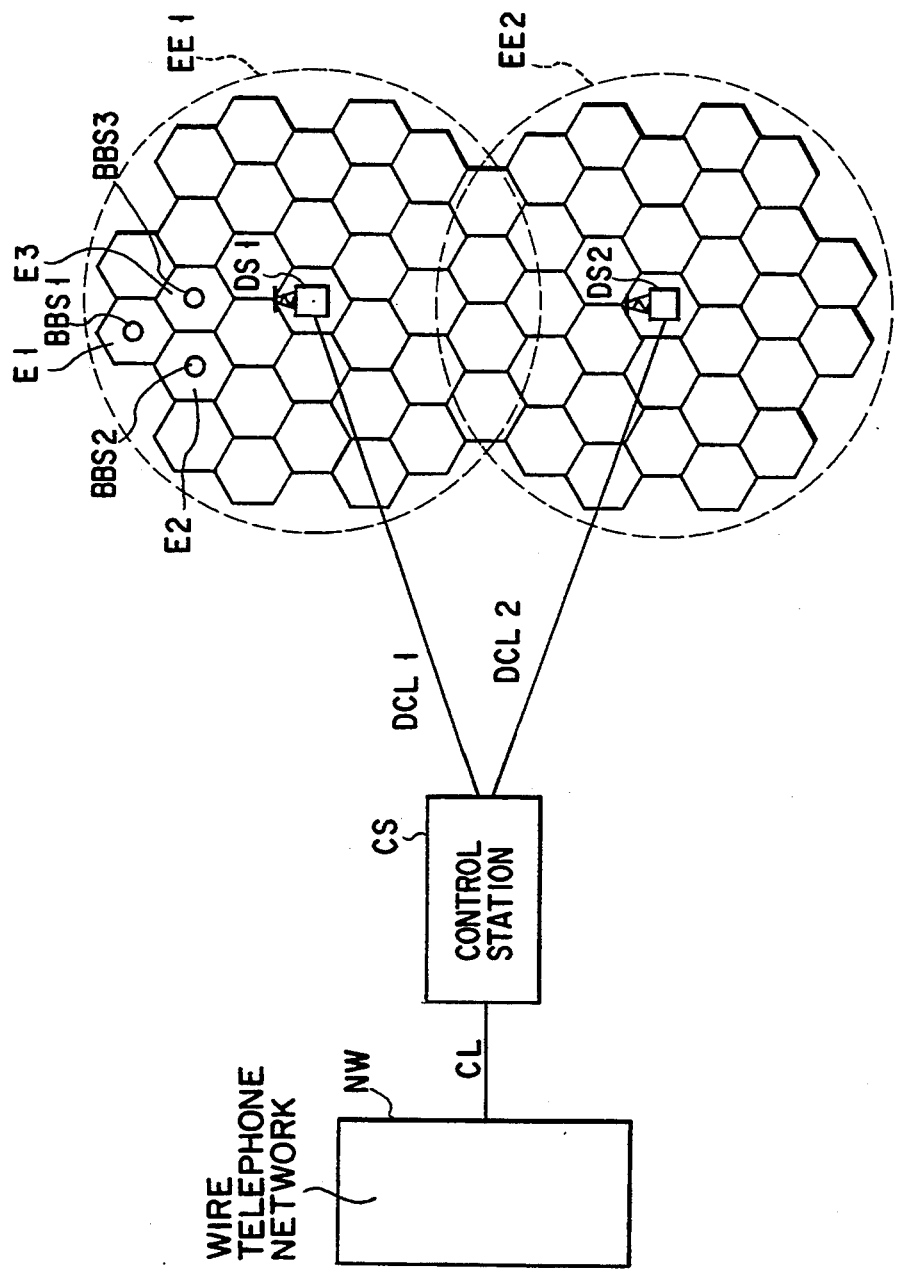
FIG. 1 is a schematic diagram of a mobile radio communication system according to an embodiment of the present invention.
Figure 10:
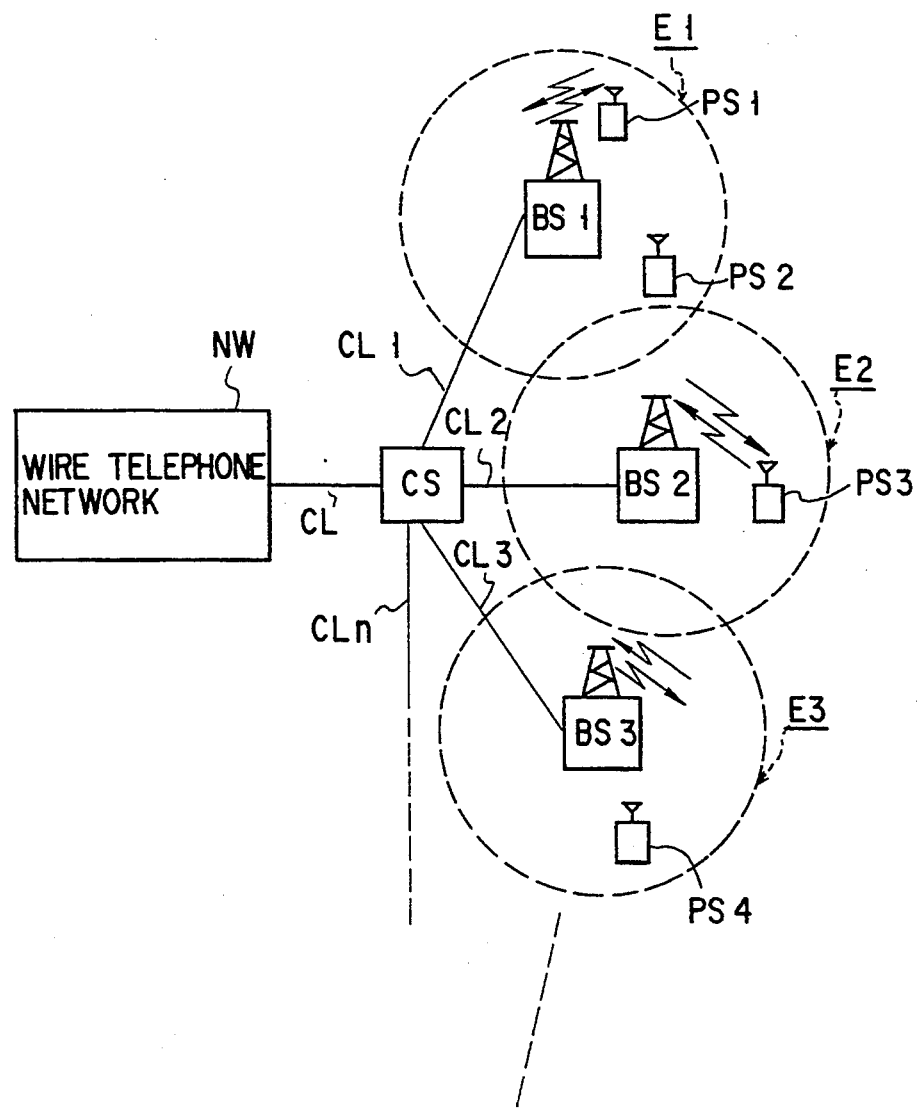
FIG. 10 is a schematic diagram of a conventional portable or land radio telephone system.
Figure 11:
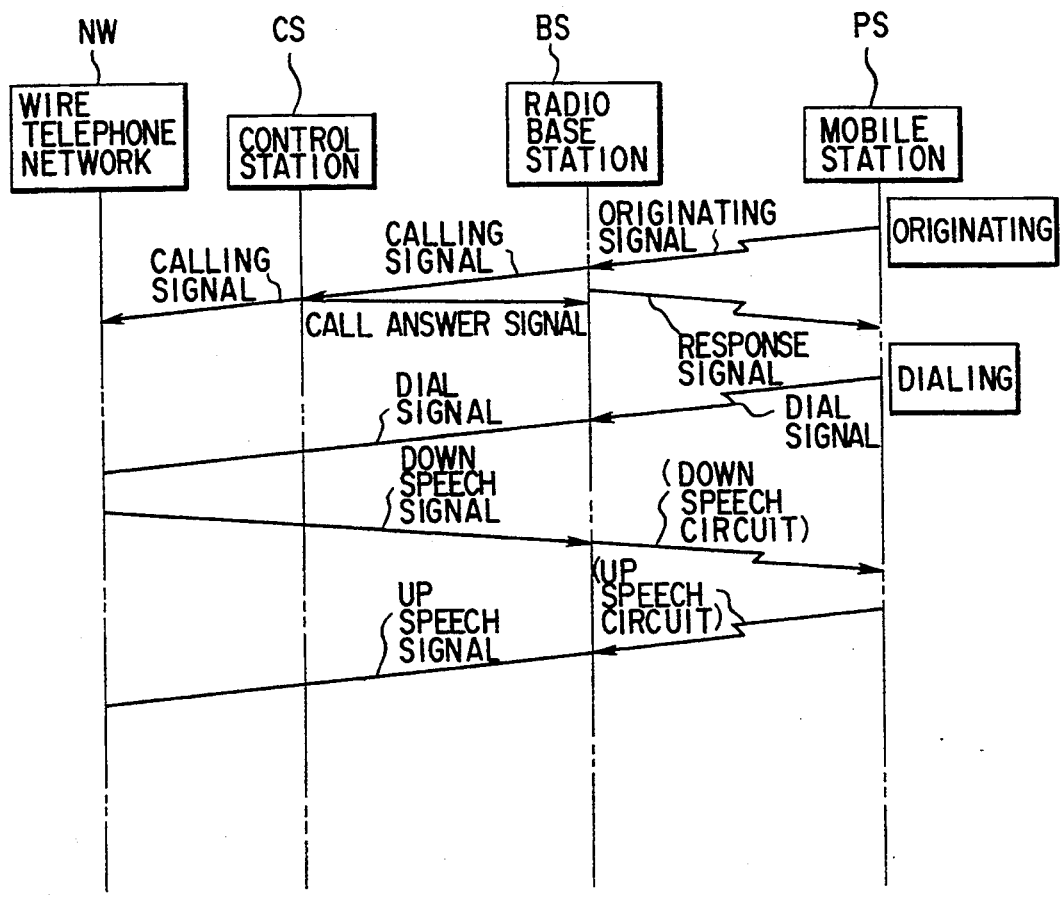
FIG. 11 illustrates the originating sequence of the communication system of FIG. 10.
Figure 12:
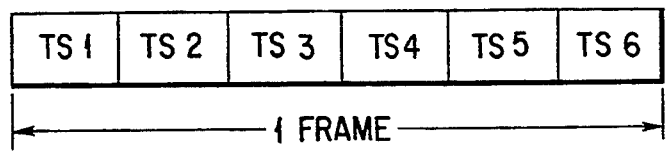
FIG. 12 illustrates the format of a conventional transmitting signal.

FIG. 1 is a schematic diagram of a mobile radio communication system according to an embodiment of the present invention. In the figure, the same parts as those in FIG. 10 are indicated by the same reference characters.

The service area of the communication system of the present invention is divided into a large number of radio zones E1, E2, E3, . . . , called cells. These radio zones E1, E2, E3, . . . have base stations BBS1, BBS2, BBS3, . . . , respectively. These base stations BBS1, BBS2, BBS3, . . . are connected to a control station CS via wire circuits (not shown) corresponding to CL1, CL2, CL3, . . . in FIG. 10. To simplify the explanation, only base stations BBS1, BBS2, and BBS3 are shown here.

Figure 6:
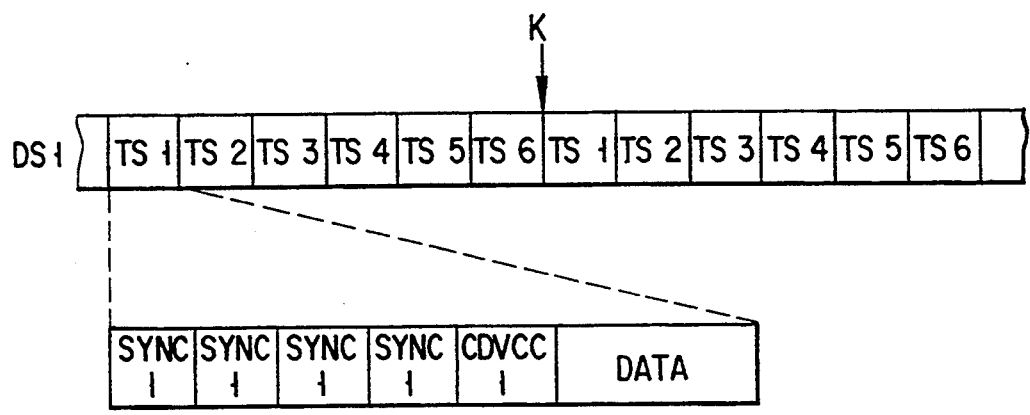
FIG. 6 shows the format of the slot synchronizing signal transmitted from the supervising radio transmitting station.

In given places in the service area with a large number of cells, supervising transmitting stations DS1 and DS2 are installed. These supervising transmitting stations DS1 and DS2, which have large radio zones EE1 and EE2 that cover the entire service area, always transmit a slot synchronizing signal to each base station and mobile station located in those large radio zones EE1 and EE2. The slot synchronizing signals have the same bit rate as that of the speech transmitting signal used between base stations and mobile stations as shown in FIG. 6 as well as the same frame structure as the speech transmitting signal. Entered into each of time slots TS1 to TS6 are synchronizing signals SYNC1 and SYNC2, . . . unique to each time slot, identifying signals CDVCC1 and CDVCC2 of supervising radio transmitting stations DS1 and DS2, and control data DATA. The control data DATA has, for example, time data inserted in it. Radio frequencies fB1 and fB2 for transmission of the slot synchronizing signals are different from radio frequencies for control and speech used in each base station and mobile station.

The supervising radio stations DS1 and DS2 are connected to the control station CS via wire circuits DCL1 and DCL2. These wire circuits DCL1 and DCL2 are used for the control station CS to transmit a selective-calling signal to the supervising radio stations DS1 and DS2. Receiving the selective-calling signal from the control station CS, the supervising radio stations DS1 and DS2 insert this signal into the data area DATA of the slot synchronizing signal before transmission.

Figure 2:
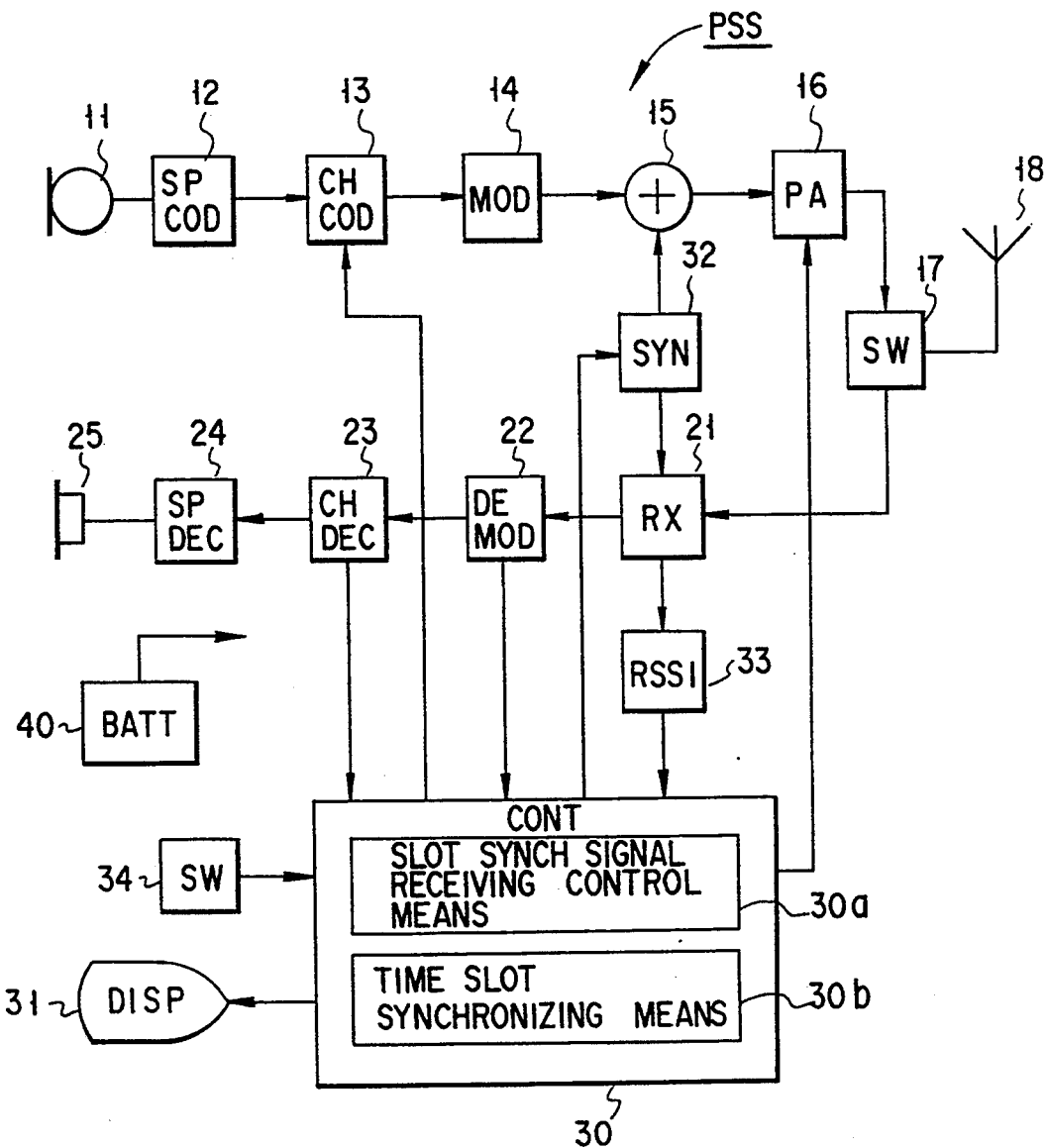
FIG. 2 is a circuit diagram of a mobile station in the system of FIG. 1.

The block diagrams in FIGS. 2 and 3 schematically illustrate the construction of a mobile station PSS and a base station BSS in the present communication system, respectively.

The mobile station PSS of FIG. 2 is composed of a transmission system, a reception system, and a control system, with a battery 40, a power supply, supplying electricity to each system.

The transmission system is made up of a telephone transmitter 11, a speech encoder (SPCOD) 12, an error correcting encoder (CHCOD) 13, a digital modulator (MOD) 14, an adder 15, a power amplifier (PA) 16, a high-frequency switching circuit (SW) 17, and an antenna 18. The speech encoder 12 encodes the transmitting signal from the transmitter 11. The error correcting encoder 13 encodes (so called channel encoding) the correction of errors in the digitized transmitting signal from the speech encoder 12 and in the digitized control signal from a control circuit 30 explained later. The digital modulator 14 produces a modulated signal in accordance with the digitized transmitting signal from the error correcting encoder 13. The adder 15 adds this modulated signal to the carrier wave signal from a frequency synthesizer 32 for frequency conversion. The power amplifier 16 amplifies the radio transmitting signal from the adder 15 to a signal with a specified transmitting power. The high-frequency switch 17, which is conductive only during a period of the transmitting time slot specified by the control circuit 30, supplies the radio transmitting signal from the power amplifier 16 to the antenna 18 during the conductive period to allow the signal to be transmitted to the base stations BBS.

The reception system is composed of a receiver RX 21, a digital demodulator (DEM) 22, an error correcting decoder (CHDEC) 23, a speech decoder (SPDEC) 24, and a telephone receiver 25. The receiver 21 frequency-converts the radio signal received by the antenna 18 and high-frequency switch 17 in a receiving time slot of a specified radio frequency. The digital demodulator 22 permits the received signal from the receiver 21 to undergo bit-synchronization and frame-synchronization, and supplies the resulting synchronized signal to the control circuit 30. The error correcting decoder 23 demodulates the correction of errors in the digital demodulated signal from the digital demodulator 22. After the error correction decoding, the digitized received signal is supplied to the speech decoder 24, and the digitized control signal is supplied to the control circuit 30. The speech decoder 24 decodes the digitized speech signal into an analog speech signal, which is then delivered as a vocal sound from the telephone receiver 25.

The control system is made up of a control circuit (CONT) 30, a display (DISP) 31 using, for example, liquid crystal, a frequency synthesizer (SYN) 32, a received signal strength indicator (RSSI) 33, and a reception request switch (SW) 34. The frequency synthesizer 32 produces local oscillating signals corresponding to channel frequencies for control, speech, and synchronization specified by the control circuit 30. The reception electric field strength detector 33 detects the strength of the reception electric field of electromagnetic wave transmitted from the base station BSS. The detected signal is sent to the control circuit 30 to search for idle channels or to monitor the outside of the service area.

The control circuit 30, whose main control section is made up of, for example, a microcomputer, has not only conventional control functions such as radio channel setting control or speech control in transmission and reception, but also a slot synchronizing signal reception control section 30a and a time slot synchronizing section 30b.

The slot synchronizing signal reception control section 30a regularly receives the slot synchronizing signal from the supervising radio transmitting station DS1 or DS2 in the waiting mode or in the speech mode, and detects a synchronizing signal SYNC. The time slot synchronizing section 30b synchronizes time slots based on the synchronizing signal detected by the slot synchronizing signal receiving control section 30a, and temporarily stores this synchronized information in an internal memory section.

Each base station BSS is constructed of similar components to those of the above mobile station PSS.

Specifically, the transmission system is made up of a hybrid circuit 51, a speech encoder (SPCOD) 52, an error correcting encoder (CHCOD) 53, a digital modulator (MOD) 54, an adder 55, a power amplifier (PA) 56, a high-frequency switching circuit (SW) 57, and an antenna 58. The speech encoder 52 encodes the speech signal from the wire telephone network NW. The error correcting encoder 53 encodes the correction of errors in the digitized speech signal from the speech encoder 52 and in the digitized control signal from a control circuit 70 explained later. The digital modulator 54 produces a modulated signal in accordance with the digitized transmitting signal from the error correcting encoder 53. The adder 55 adds this modulated signal to the high frequency signal from a frequency synthesizer 72 to convert the modulated signal into a signal of a radio frequency corresponding to a speech channel. The power amplifier 56 amplifies the radio transmitting signal from the adder 55 to a signal with a specified transmitting power. The high-frequency switch 57, which is conductive only during a period of the transmitting time slot specified by the control circuit 70, supplies the radio transmitting signal from the power amplifier 56 to the antenna 58 during the conductive period to allow the signal to be transmitted from the antenna 58 to the mobile station.

The reception system is composed of a receiver RX 61, a digital demodulator (DEM) 62, an error correcting decoder (CHDEC) 63, and a speech decoder (SPDEC) 64. The receiver 61 frequency-converts the radio signal received by the antenna 58 and high-frequency switch 57 in a receiving time slot of the speech channel. The digital demodulator 62 allows the received signal from the receiver 61 to undergo bit-synchronization and frame-synchronization, and supplies the resulting synchronized signal to the control circuit 70. The error correcting decoder 63 demodulates the correction of errors in the digital demodulated signal from the digital demodulator 62. After the error correction decoding, the digitized speech signal is supplied to the speech decoder 64, and at the same time, the digitized control signal is supplied to the control circuit 70. The speech decoder 64 decodes the digitized speech signal into an analog speech signal, which is then transferred to wire circuits CL1 to CLn via the hybrid circuit 51.

The control system is made up of a control circuit (CONT) 70, a frequency synthesizer (SYN) 72, and a received signal strength indicator (RSSI) 73. The frequency synthesizer 72 produces local oscillating signals corresponding to channel frequencies for control, speech, and synchronization specified by the control circuit 70. The reception electric field strength detector 73 detects the strength of the reception electric field of the radio signal transmitted from the mobile station. The detected signal is sent to the control circuit 70 to search for idle channels or to monitor the outside of the service area.

The control circuit 70 has not only conventional control functions such as radio message channel setting control or speech control in transmission and reception, but also a slot synchronizing signal reception control section 70a and a time slot synchronizing section 70b.

The slot synchronizing signal reception control section 70a regularly receives the slot synchronizing signal from the supervising radio transmitting station DS1 or DS2 in the waiting mode or in the speech mode, and detects the synchronizing signal SYNC. The time slot synchronizing section 70b synchronizes time slots based on the synchronizing signal detected by the slot synchronizing signal reception control section 70a, and temporarily stores this synchronized information.

Each of base stations BBS1 to BBSn is provided with more than one communication unit of the FIG. 3 construction.

The operation of the communication system constructed as described above will be explained.

The supervising radio transmitting stations DS1 and DS2 are always transmitting the FIG. 6 slot synchronizing signal to the large radio zones EE1 and EE2 that they are covering, respectively. Here, for the transmitting frequency of the slot synchronizing signal, radio frequencies fB1 and fB2 are permanently used which differ from those of control signals and speech signals used in the base stations BBS1, BBS2, ... and mobile stations in the system. Thus, there is no possibility that the transmission of the slot synchronizing signal interferes with the communication between the base stations BSS and the mobile stations. Because the number of radio frequencies fB1 and fB2 used for transmission of the slot synchronizing signal is as small as two, this allows the system to use the frequencies efficiently.

Figure 4:
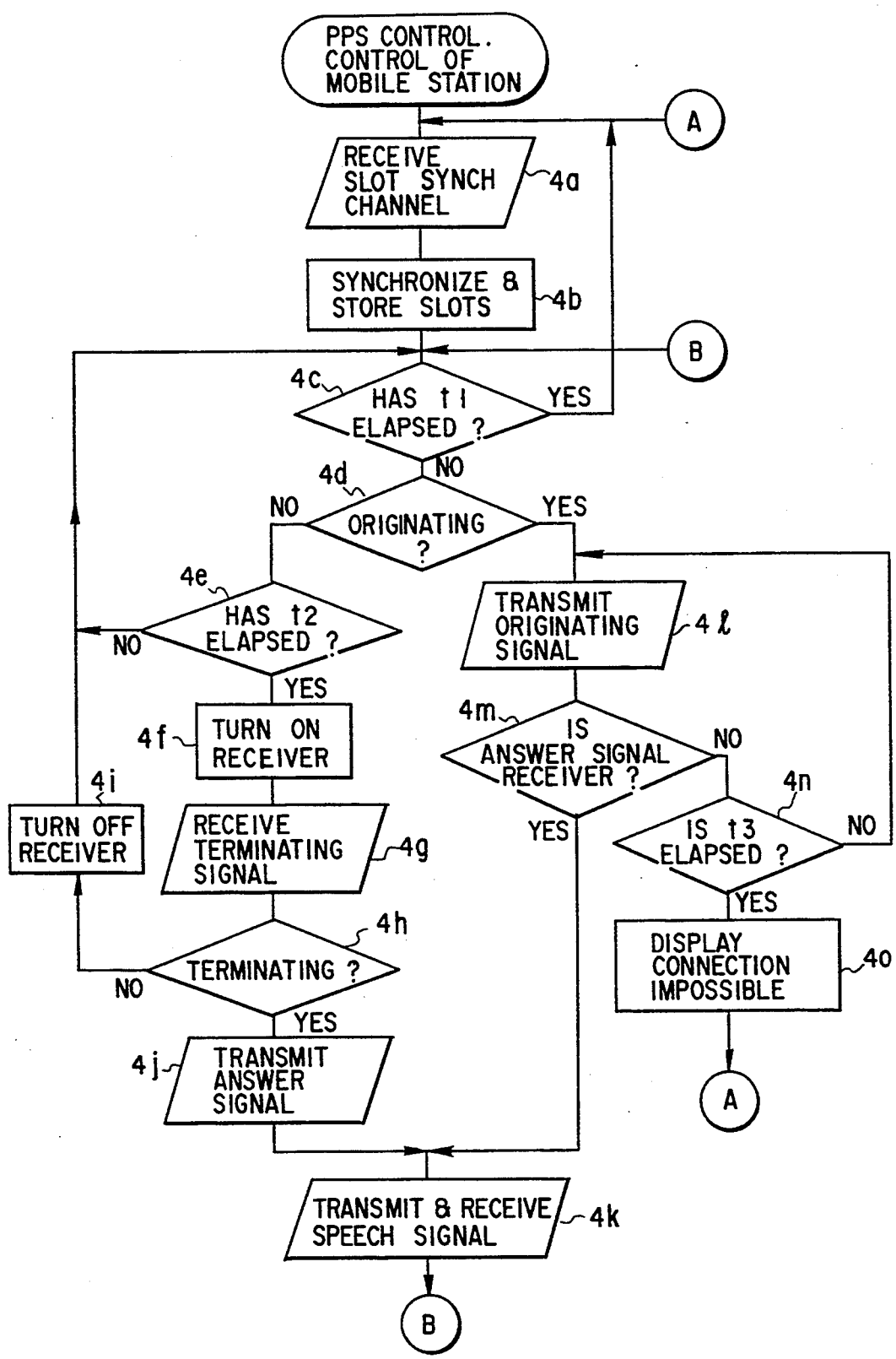
FIG. 4 is a flowchart of the control sequence of the control circuit of the FIG. 2 mobile station.

Each mobile station PSS and base station BSS in the present system perform the following control. As shown in FIG. 4 flowchart, in the mobile station PSS, the control circuit 30 are repeating the following actions in the waiting state: the monitoring of an elapse of time t1 at step 4c; the monitoring of the operation of originating request switch 34 at step 4d; and the monitoring of an elapse of time t2 at step 4e. The monitoring of an elapse of time t1 is for finding out the time at which the time slots of the station are synchronized. Time t1 is set for 30 minutes, for example. The monitoring of an elapse of time t2 is for setting intermittent reception timings of the receiver 21 for battery power saving.

In the monitoring state, after time t1 has elapsed and it is time to resynchronize its own time slots, the control circuit 30 passes control to step 4a. At step 4a, the receiver 21 is first brought in the operating state to receive the slot synchronizing signal and the received signal is set for the radio frequency fB1 or fB2. After this, the reception system of the mobile station receives the slot synchronizing signal from the supervising radio transmitting station DS1 or DS2. This received signal undergoes error correction decoding at the error correction decoder 23, and then is supplied to the control circuit 30. At step 4b, the control circuit 30 checks the received signal for the synchronizing signal SYNC. If the synchronizing signal SYNC has been recognized, the start timing K of the time slot TS1 of FIG. 6 is calculated based on the synchronizing signal SYNC and the position of the simultaneously recognized transmitting station identifying information CDVCC. This calculated timing K is stored as slot synchronizing information in the RAM of the control circuit 30. The start timing of other timing slots TS2 to TS6 may be stored in place of that of time slot TS1. Further, the start timing of all time slots TS1 to TS6 may be stored.

Figure 5:
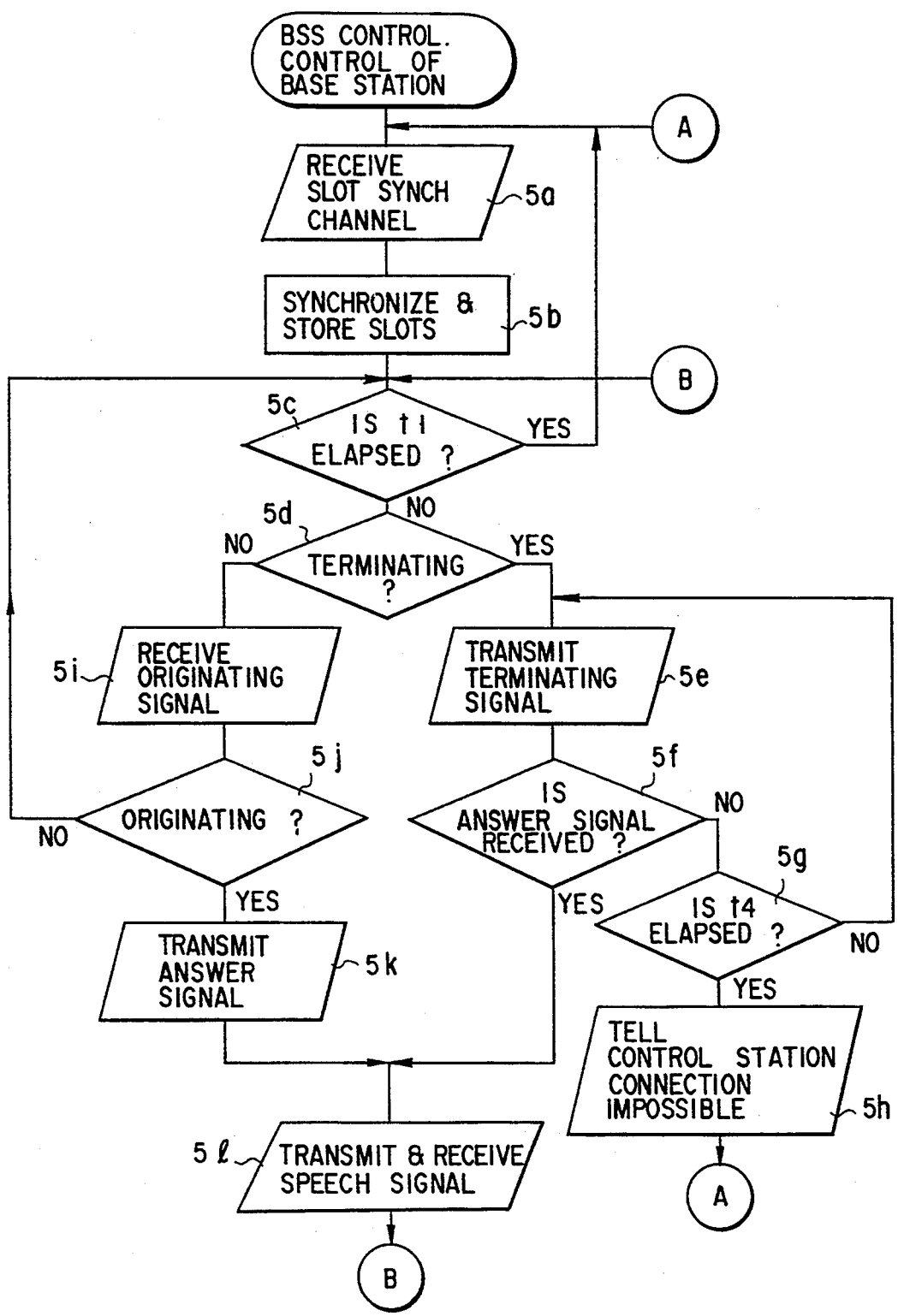
FIG. 5 is a flowchart of the control sequence of the control circuit of the FIG. 3 base station.

As shown in FIG. 5, in each base station, the control circuit 70 is carrying out the following actions in the waiting state: the monitoring of the incoming of a terminating signal from the wire telephone network NW at step 5d; the monitoring of the incoming of an originating signal from a mobile station at steps 5i and 5j; and the monitoring of an elapse of time t1=30 minutes to resynchronize its own time slots. If the time at which its own time slots are to be resynchronized has passed in the monitoring state, the base station BSS, like the mobile station, brings the receiver 61 in the state for receiving the radio frequency fB1 or fB2 to receive the slot synchronizing signal from the supervising radio transmitting station DS1 or DS2. Then, at step 5b, the received signal is checked for the synchronizing signal SYNC. If the synchronizing signal SYNC has been recognized, the start timing K of the time slot TS1 is calculated based on the synchronizing signal SYNC and the position of the simultaneously recognized transmitting station identifying information CDVCC. This calculated timing K is stored as slot synchronizing information in the RAM of the control circuit 70. As with the aforementioned mobile station, the start timing of other timing slots TS2 to TS6 may be stored in place of that of time slot TS1. Further, the start timing of all time slots TS1 to TS6 may be stored.

After the above-described processes are completed, each mobile station PSS and each base station BBS has stored the common slot synchronizing information K based on the slot synchronizing signal transmitted from the common supervising radio transmitting station DS1 or DS2. That is, the mobile stations and base stations BSS in the large radio zones EE1 and EE2 covered by the supervising radio transmitting stations DS1 and DS2 are all synchronized with each other in terms of time slots.

In this state, if the originating request switch 34 is pressed at any one of mobile stations, the control circuit 30 of the mobile station passes control from step 4d to step 41 in the FIG. 4. At step 41, after the transmission time slot of the control channel has been set based on the slot synchronizing information previously stored, the mobile station, using this time slot, transmits an originating signal to the nearest base station BBS.

In the base station BSS, at steps 5i and 5j, the incoming of an originating signal from a mobile station has been monitoring. Specifically, at step 5i, after the reception time slot of the control channel has been set based on the slot synchronizing information previously stored, the originating signal from the mobile station is received in the reception time slot. At step 5j, it is judged whether or not the received signal is an originating signal. If it is recognized that the originating signal has been received, the control circuit 70 passes control to step 5k, where an originating answer signal is sent back to the originating mobile station. In addition to ID information on the mobile station, speech channel specifying information is inserted in the originating answer signal. The speech channel specifying information, composed of information on radio frequency for speech and information on time slot position, is determined by an idle channel search based on the timing of slot synchronizing information previously stored. Then, the control circuit 70 passes control to step 51 after having sent back the originating answer signal. At step 51, once the radio frequency and time slot for speech have been set, from this time on, it is possible to talk over the circuit.

After having transmitted the originating signal, the mobile station monitors an elapse of time t3 at step 4n, as well as the incoming of an originating answer signal at step 4m. If an originating answer signal has been returned within t3, control proceeds to step 4j, where the radio frequency and time slot for speech are set according to the speech channel specifying information inserted in this answer signal. For this time on, the circuit is in the speech state. If the originating answer signal has not been returned even after time t3 has elapsed, the control section judges that there is a possibility that time slots are out of synchronization, and causes the display 31 to display "Connection Impossible" at step 4o. After this, control is returned to step 4a, where slots are synchronized based on the slot synchronizing signal transmitted from the supervising radio transmitting station DS1 or DS2.

In the mobile station and base station, at steps 4c and 5c, the timing of resynchronizing slots is monitored also in the speech state. When the timing of resynchronizing slots comes, slots are resynchronized at steps 4a and 4b, and steps 5a and 5b. In order not to affect the transmission and reception of the speech signal, the slot synchronizing signal is received from the supervising radio transmitting station DS1 of DS2, making use of idle time slots other than those used for speech.

When the wire telephone network NW produces a terminating signal, the following control is performed. Specifically, receiving a terminating signal from the network NW via the control station CS, the base station BSS detects the signal at step 5d in FIG. 5, and passes control to step 5e. At step 5e, the transmission time slot of the control channel is set based on the slot synchronizing information previously stored. The terminating signal is transmitted, using this time slot. In addition to a code indicating a terminating signal, ID information (telephone number) on the terminating mobile station and speech channel specifying information are inserted into the terminating signal. The terminating signal may be inserted in all time slots TS1 to TS 6 before transmission. Such setting allows the mobile station to detect the terminating signal as soon as possible irrespective of the time slot in which the terminating signal is being monitored. If more than one termination takes place, it is necessary to divide time slots into, for example, groups of three slots.

The mobile station is monitoring the intermittent reception timing in the waiting state, at step 4e in FIG. 4 as mentioned earlier. Specifically, when the reception timing is reached, the mobile station is placed in the receiving state after having supplied power to the receiver 21 at step 4f. At step 4g, the reception time slot of the control channel is set based on the slot synchronizing information previously stored, and then the terminating signal is received. At step 4h, it is judged whether or not the received signal is the terminating signal aiming at this station. If no terminating signal has been detected, at step 4i, the receiver 21 is turned off, and the station is placed in the waiting state.

If a terminating signal aiming at this station has been detected, the mobile station passes control to step 4j, where a terminating answer signal is sent back to the base station BSS, using the transmission time slot of the control channel. After this, at step 4k, the radio frequency and time slot for speech are set according to the speech channel specifying information inserted in the terminating signal. From this time on, the speech signal is allowed to be transmitted and received through this speech channel.

After having transmitted the terminating signal, the base station BSS monitors an elapse of time t4 at step 5g, as well as a return of a terminating answer signal from the mobile station at step 5f. If a terminating answer signal is returned within time t4, control is passed to step 5l, where the radio frequency and time slot for speech are set. From this time on, the circuit is placed in the speech state. If the terminating answer signal has not been returned even after time t4 has elapsed, the control section judges that there is a possibility that time slots are out of synchronization, and informs the control section that connection is impossible at step 5h. After this, control is returned to step 5a, where slots are synchronized based on the slot synchronizing signal transmitted from the supervising radio transmitting station DS1 or DS2.

As noted above, with this embodiment, each base station BSS and each mobile station are regularly synchronized in terms of time slots based on the slot synchronizing signal constantly transmitted from the supervising radio transmitting station DS1 or DS2. Thus, the time slots are kept synchronized in all base stations BBS and mobile stations.

Figure 7:
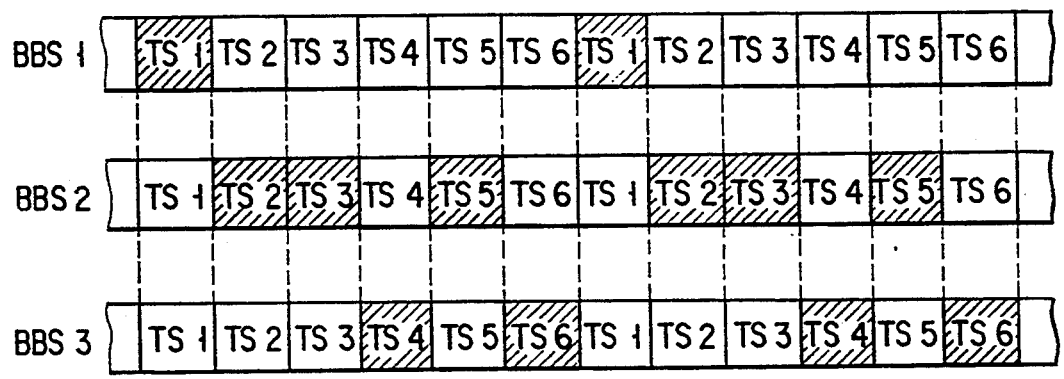
FIG. 7 is a timing diagram showing the state in which time slots exchanged between base stations are synchronized with each other.

FIG. 7 shows the timing of the time slots set in the base stations BBS1, BBS2, and BBS3 of FIG. 1, with the time slots in synchronization with each other between stations. Sharing the time slots TS1 to TS6 of the common speech radio frequencies as shown in FIG. 7, the base stations BBS1, BBS2, and BBS3 can use these slots efficiently without interference with each other. Thus, even if imbalanced traffic takes place between base stations, it can be averaged over those time slots.

Figure 8:
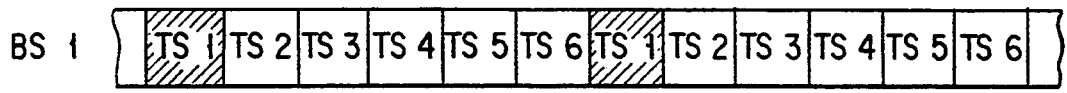
FIG. 8 is a timing diagram showing the state in a conventional system in which time slots exchanged between base stations are not synchronized with each other.
Figure 8:
Figure 8:
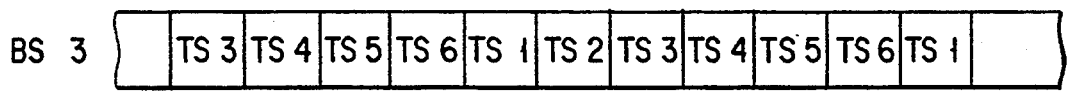

For the sake of comparison, a conventional system will be explained which has no slot synchronization between base stations. For example, as shown in FIG. 8, the time slots of the base stations BS1, BS2, and BS3 do not coincide with one another in terms of positions with respect to time. For example, it is assumed that the base station BS1 uses time slot TS1, and the base station BS2 uses time slots TS2, TS3, and TS5. Because time slots TS4 and TS6 are idle slots, they could be used by base station BS3. An attempt to use time slots TS4 and TS6 introduces interference with time slots TS2, TS3, and TS5 now in operation, making it practically impossible to use time slots TS4 and TS6. Consequently, with the system where time slots are not synchronized with each other, the speech channels are used at a very low efficiency and imbalanced traffic between base stations cannot be elevated effectively.

With the arrangement of the present embodiment, the supervising radio transmitting stations BS1 and BS2 transmit the slot synchronizing signal to each base station and mobile station so that those stations may be synchronized in terms of time slots. This approach allows relatively simple facilities and control to synchronize all base stations and mobile stations in terms of time slots in comparison with the supply of synchronizing signal from the control station to each base station through control wires laid between them.

In the present embodiment, because the supervising radio transmitting stations DS1 and DS2 are designed to be shared by a selective calling communication system, it is possible to construct an integrated mobile radio communication system including a selective calling function, using relatively simple facilities.

This invention is not limited to the above-described embodiment. For instance, while in the embodiment, both the base stations and mobile stations are synchronized in terms of time slots, the slots may be synchronized only in the base stations or only in the mobile stations. With such setting, the mobile stations or base stations not in slot synchronization should be synchronized later in terms of slots based on the signal transmitted from the already slot-synchronized base stations or mobile stations.

Although in the embodiment, only two supervising radio transmitting stations are provided, three or more radio transmitting stations may be installed or only one may be provided. In the case of more than two radio transmitting stations, it is not always necessary to use a different transmitting frequency for each supervising radio transmitting station. The same transmitting frequency may be used in a time-division manner. In this case, insertion of the identification code of the supervising radio transmitting station into the slot synchronizing signal enables each base station and mobile station to resynchronize their time slots based on the slot synchronizing signal sent from the same supervising radio transmitting station.

The slot synchronizing signal is not necessarily constantly transmitted, it may be transmitted intermittently at regular intervals or at random.

Figure 9:
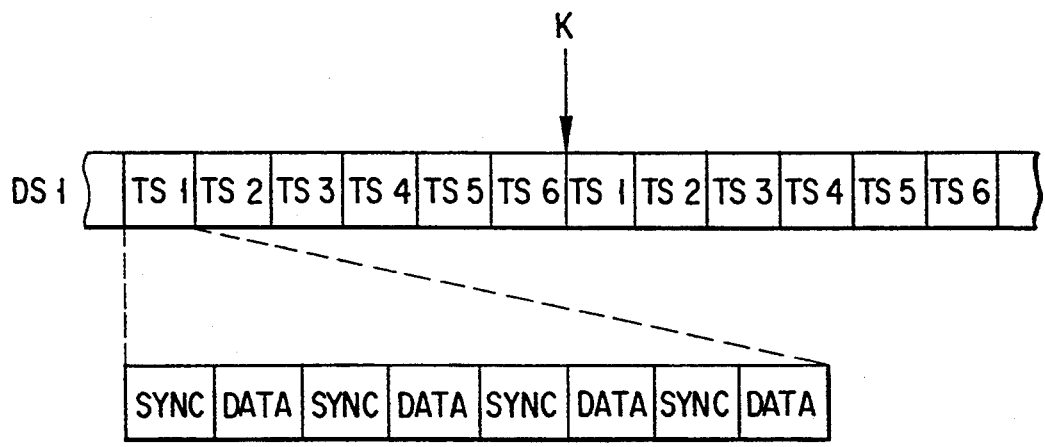
FIG. 9 illustrates another format of the slot synchronizing signal transmitted from the supervising radio transmitting station of the present invention.

The format of the slot synchronizing signal may be structured, for example, as shown in FIG. 9. Since the synchronizing signal SYNC is very short compared with the time slot length, data on the position of the synchronizing signal SYNC may be added to its end. For instance, data on how many bits the end bit of the synchronizing signal SYNC is apart from the starting position K of the frame may be placed immediately after the end bit. The format thus structured allows the position of K to be computed easily from the above data at the base station and mobile station.

While in the embodiment, the supervising radio transmitting stations are installed so as to cover the entire service area, they are not necessarily placed in that way. For example, they may be built so as to cover only city service areas with relatively high traffic.

An automatic frequency control (AFC) may be installed in either the base stations or the mobile stations or both so that the radio frequencies of the base stations and mobile stations may be controlled based on the transmitting frequency of the supervising radio transmitting station. This not only maintains the radio frequencies of the base stations and mobile stations at a very stable state, but also lowers the cost of the crystal oscillator of the frequency synthesizer.

AFC may be achieved in other forms. For instance, reference information on radio frequency has been inserted in the data area of the slot synchronizing signal beforehand. Based on this reference information, the base and mobile stations may be controlled so that their own frequency may be stabilized.

The time slot of the control channel that the mobile station uses to transmit an originating signal may be selected at random. For instance, a time slot corresponding to the remainder from the telephone number of the mobile station divided by the number of time slots may be used.

When an answer signal cannot be received, transmitting time slots may be changed at random and transmitted again. This approach helps prevent originating signals from colliding with each other between mobile stations.

This invention may be practiced or embodied in still other ways without departing from the spirit or essential character thereof, in terms of the shape or size of an area covered by one supervising radio transmitting station, the format of slot synchronizing signal, a synchronizing means based on the slot synchronizing signal, the construction of a base station and a mobile station, and the control sequence and function of their control circuits.

As described in detail, this invention provides a mobile radio communication system featuring simple facilities and control, in which a supervising radio transmitting station is provided to transmit by radio a reference synchronizing signal to at least either the base stations or the mobile stations. At least either the base stations or the mobile stations synchronize their time slots based on the reference synchronizing signal. This configuration allows the base stations to share different time slots of the same radio frequency, thereby successfully alleviating imbalanced traffic.

In one embodiment of the present invention, frequency control sections are installed in at least either the base stations or the mobile stations. The frequency control section keeps the speech radio frequency constant based on the reference synchronizing signal from the supervising radio transmitting station. This configuration always maintains the radio frequency in a stable state without installing expensive oscillators in the base stations and mobile stations. Thus, with this embodiment, it is possible to provide a mobile radio communication system with improved communication quality and low-cost base stations and mobile stations.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A radio communication system comprising:
a plurality of base stations, each forming a radio zone;
a plurality of mobile stations, wherein signals are transmitted between said plurality of mobile stations and said plurality of base stations in a time-division multiplexing manner over a first radio link established using digital radio circuitry that time-division multiplexes a specific time interval into a plurality of time slots;
at least one supervising radio transmitting station for transmitting a reference synchronizing signal to a first and a second base station of said plurality of base stations via a second radio link, said reference synchronizing signal being used in establishing a synchronous relationship between said first and second base stations;
receiving means provided in each of said first and second base stations, for receiving said reference synchronizing signal from said supervising radio transmitting station via said second radio link; and synchronizing means provided in each of said first and second base stations, for establishing a synchronous time-slot relationship in said digital radio circuitry between said first and second base stations and said mobile stations, based on said reference synchronizing signal received by said receiving means, wherein said digital radio circuitry includes a frequency variable control unit for establishing a transmission frequency at which a mobile station and a base station transmit signals over the first radio link based on said reference synchronizing signal.

2. The radio communication system according to claim 1, wherein said frequency variable control unit establishes the transmission frequency based on the transmitting frequency of said at least one supervising radio transmitting station.

3. The radio communication system according to claim 1, wherein said frequency variable control unit establishes the transmission frequency based on information contained in the reference synchronizing signal.

4. A radio communication system comprising:

a plurality of base stations, each forming a radio zone;

a plurality of mobile stations, wherein signals are transmitted between said plurality of mobile stations and said plurality of base stations in a time-division multiplexing manner over a first radio link established using digital radio circuitry that time-division multiplexes a specific time interval into a plurality of time slots, said plurality of mobile stations including a first and a second mobile station communicating with different ones of said plurality of base stations;

at least one supervising radio transmitting station for transmitting a reference synchronizing signal to said first and second mobile stations via a second radio link, said reference synchronizing signal being used in establishing a synchronous relationship between said first and second mobile stations;

receiving means provided in each of said first and second mobile stations, for receiving said reference synchronizing signal from said supervising radio transmitting station via said second radio link; and synchronizing means provided in each of said first and second mobile stations, for establishing a synchronous time-slot relationship in said digital radio circuitry between said first and second mobile stations and said base stations, based on said reference synchronizing signal received by said receiving means.

5. The radio communication system according to claim 4, wherein said supervising radio transmitting station has the same communicating functions of transmitting and receiving as those of said first base station and said second base station used in a paging system for transmitting a paging signal to a paging apparatus.

6. The radio communication system according to claim 4, further comprising a second supervising radio transmitting station, wherein said at least one supervising radio transmitting station and said second supervising radio transmitting station transmit said reference synchronizing signal at the same frequency to said first and second mobile stations.

7. The radio communication system according to claim 4, wherein said at least one supervising radio transmitting station transmits said reference synchronizing signal to said first and second mobile stations at prescribed periodic intervals.

8. The radio communication system according to claim 4, wherein said at least one supervising radio transmitting station transmits said reference synchronizing signal at first periodic intervals to said receiving means via said second radio link.

9. The radio communication system according to claim 8, wherein said receiving means further receives a signal from said base station at second periodic intervals shorter than said first periodic intervals.

10. A radio communication system comprising:

a plurality of base stations, each forming a radio zone;

a plurality of mobile stations, wherein signals are transmitted between said plurality of mobile stations and said plurality of base stations in a time-division multiplexing manner over a first radio link established using digital radio circuitry that time-division multiplexes a specific time interval into a plurality of time slots;

at least one supervising radio transmitting station for transmitting a reference synchronizing signal via a second radio link to a first one of said plurality base stations and a first one of said plurality of mobile stations communicating with a second base station different from said first base station, said reference synchronizing signal being used in establishing synchronous relationship between said first base station and said first mobile station;

receiving means provided in each of said first base station and said first mobile station, for receiving said reference synchronizing signal from said supervising radio transmitting station via said second radio link; and synchronizing means provided in each of said first base station and said first mobile station, for establishing a synchronous time-slot relationship in said digital radio circuitry between said first base station and a second one of said plurality of mobile stations communicating with said first base station and said first mobile station communicating with said second base station, based on said reference synchronizing signal received by said receiving means.

11. The radio communication system according to claim 10, wherein said supervising radio transmitting station has the same communicating functions of transmitting and receiving as those of said first base station and said second base station used in a paging system for transmitting a paging signal to a paging apparatus.

12. The radio communication system according to claim 10, further comprising a second supervising radio transmitting station, wherein said at least one supervising radio transmitting station and said second supervising radio transmitting station transmit said reference synchronizing signal at the same frequency to said first base station and said first mobile station.

13. The radio communication system according to claim 10, wherein said supervising radio transmitting station transmits said reference synchronizing signal to said first base station and said first mobile station at prescribed periodic intervals.

14. The radio communication system according to claim 10, wherein said supervising radio transmitting station transmits said reference synchronizing signal at prescribed periodic intervals to said receiving means via said second radio link.

15. The radio communication system according to claim 14, wherein said receiving means installed in said first mobile station further receives a signal from said second base station at second periodic intervals shorter than said first periodic intervals.

16. A radio communication system comprising:
a plurality of base stations, each forming a radio zone;
a plurality of mobile stations, wherein signals are transmitted between said plurality of mobile stations and said plurality of base stations in a time-division multiplexing manner over a first radio link established using digital radio circuitry that time-division multiplexes a specific time interval into a plurality of time slots;
at least one supervising radio transmitting station for transmitting a reference synchronizing signal to a first and a second base station of said plurality of base stations via a second radio link, said reference synchronizing signal being used in establishing a synchronous relationship between said first and second base stations;
receiving means provided in each of said first and second base stations, for receiving said reference synchronizing signal from said supervising radio transmitting station via said second radio link; and
synchronizing means provided in each of said first and second base stations, for establishing a synchronous time-slot relationship in said digital radio circuitry between said first and second base stations and said mobile stations, based on said reference synchronizing signal received by said receiving means,
wherein said first and second base stations and said mobile stations are synchronized with each other, and communications are made at the same frequency and in different time slots between said first and second base stations and said mobile stations which have been synchronized with each other.

17. The radio communication system according to claim 16, wherein said supervising radio transmitting station has the same communicating functions of transmitting and receiving as those of said first base station and said second base station used in a paging system for transmitting a paging signal to a paging apparatus.

18. The radio communication system according to claim 16, further comprising a second supervising radio transmitting station, wherein said at least one supervising radio transmitting station and said second supervising radio transmitting station transmit said reference synchronizing signal at the same frequency to said first and second base stations.

19. The radio communication system according to claim 16, wherein said supervising radio transmitting station transmits said reference synchronizing signal to said first and second base stations at prescribed periodic intervals.

20. The radio communication system according to claim 16, wherein said supervising radio transmitting station transmits said reference synchronizing signal at prescribed periodic intervals to said receiving means via said second radio link.

* * * * *